(12) United States Patent
Hwang et al.

(10) Patent No.: US 8,902,305 B2
(45) Date of Patent: Dec. 2, 2014

(54) SYSTEM AND METHOD FOR MANAGING FACE DATA

(75) Inventors: Bon Woo Hwang, Daejeon (KR); Kap Kee Kim, Daejeon (KR); Seung-Uk Yoon, Daejeon (KR); Bonki Koo, Daejeon (KR); Ji Hyung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 13/566,938

(22) Filed: Aug. 3, 2012

(65) Prior Publication Data

US 2013/0057656 A1  Mar. 7, 2013

(30) Foreign Application Priority Data

Sep. 6, 2011  (KR) ........................ 10-2011-0090282

(51) Int. Cl.
*H04N 13/00* (2006.01)
*H04N 13/02* (2006.01)
*G06K 9/00* (2006.01)
*G06T 17/00* (2006.01)

(52) U.S. Cl.
CPC ............ *G06K 9/00275* (2013.01); *G06T 17/00* (2013.01); *G06K 9/00993* (2013.01)
USPC ................... 348/77; 348/45; 348/47; 348/65; 382/118

(58) Field of Classification Search
USPC ............................ 348/45, 47, 65, 77; 382/118
See application file for complete search history.

(56) References Cited

U.S. PATENT DOCUMENTS

| | | | |
|---|---|---|---|
| 2007/0047775 A1* | 3/2007 | Okubo | 382/118 |
| 2008/0085042 A1 | 4/2008 | Trofimov et al. | |
| 2008/0175509 A1 | 7/2008 | Wheeler et al. | |
| 2010/0002912 A1* | 1/2010 | Solinsky | 382/117 |

FOREIGN PATENT DOCUMENTS

| | | |
|---|---|---|
| KR | 1020040075672 A | 8/2004 |
| KR | 1020080032612 A | 4/2008 |

OTHER PUBLICATIONS

Juan Felipe Garcia et al, "Image-guided endoscopic sinus surgery", Operative Techniques in Otolaryngology—Head and Neck Surgery, Jun. 2001, pp. 76-79, vol. 12.

* cited by examiner

*Primary Examiner* — Jeffery Harold
*Assistant Examiner* — Michael Teitelbaum

(57) ABSTRACT

A system for managing face data includes a global face capturing unit configured to capture a global face image; and a global face data generation unit configured to obtain shape information and texture information of global face data, and generate the global face data. Further, the system includes a local face capturing unit configured to capture a plurality of local face images; and a global face posture extraction unit configured to estimate a position and a direction of the face of a captured user. Furthermore, the system includes a local capturing device posture extraction unit configured to extract posture information of the local face capturing unit; and a local face data generation unit configured to generate texture information and shape information, and generate local face data.

20 Claims, 3 Drawing Sheets

SYSTEM AND METHOD FOR MANAGING FACE DATA

CROSS-REFERENCE TO RELATED APPLICATION(S)

The present invention claims priority of Korean Patent Application No. 10-2011-0090282, filed on Sep. 6, 2011, which is incorporated herein by reference.

FIELD OF THE INVENTION

The present invention relates to the generation and exploration of face data and; more particularly, to a system and a method for managing face data, which are capable of generating and storing pieces of heterogeneous face data including low-magnification global face data and high-magnification local face data and exploring the stored face data.

BACKGROUND OF THE INVENTION

When a face image is captured to carry out skin management and medical treatment as they are currently done, a high-resolution global face image is captured and magnified, and then a local region of the captured global face image is explored. Alternatively, if necessary, only a local region of a face is captured using a local face capturing device and then used. In this case, global face data and local face data are handled independently, or a relationship between the two pieces of data is designated in a manual operation performed by a user. For example, simple text descriptors such as "right eye rim" and "upper right cheek" are attached to individual captured regions of local face data or, alternatively, corresponding points are directly designated in a facial region image, so that the correlations between the local face data with the global face data are set. This is similar to a case in which a user sets correspondence relationships between a high-resolution map (a small-scale map) and a low-resolution map (a large-scale map) using a manual operation and compares and explores the two maps.

The above-described conventional technology is disadvantageous in that it is merely possible to separately explore global face data captured at a low-power magnification and local face data captured at a high-power magnification, or to only use parts of such data when conducting exploration using approximate correspondence relationships obtained by using the manual operation.

Further, there is a conventional method of obtaining three-dimensional (3D) images of the surroundings of internal organs based on the anatomical features of the exterior of the internal organs, generating a geometrical model from the 3D images, obtaining another 3D image including the internal organs using an invasive probe, and matching this 3D image with the previously generated geometrical model. However, in this method, target objects that are handled are limited to internal organs of a human body.

Further, there is another conventional apparatus for matching 3D CT scan data with an endoscopic image and showing in real time the resulting matching image when performing paranasal sinus surgery. However, even in this apparatus, target objects that are handled and the components and applications of the invention are also limited to within a specific range.

SUMMARY OF THE INVENTION

In view of the above, the present invention provides a system and a method for managing face data, which are capable of automatically matching global face data with local face data and utilizing the matching data for exploring a face region, thus allowing a user to explore the face region while effectively making a transition between low-magnification global face data and high-magnification local face data.

Further, the present invention provides the system and method for managing the face data, which are able to allowing a user to select a desired region to be explored at a desired magnification and to explore the desired region by automatically setting the correspondence relationships between the global face data and the local face data and utilizing the set correspondence relationships to carry out exploration, unlike the conventional technology in which the global face data and the local face data are independently managed or in which the correspondence relationships are set using simple text inserted by a manual operation or using approximate position information.

In accordance with a first aspect of the present invention, there is provided a system for managing face data, including: a global face capturing unit configured to capture a global face image; a global face data generation unit configured to obtain shape information and texture information of global face data by measuring a phase shift in the global face image and by estimating a three-dimensional (3D) position of a face, and generate the global face data using the shape information and the texture information; a local face capturing unit configured to capture a plurality of local face images while contacting a surface of the face or approaching the face up to a preset distance; a global face posture extraction unit configured to estimate a position and a direction of the face of a captured user upon capturing the local face images using the local face capturing unit to extract a global face posture; a local capturing device posture extraction unit configured to extract posture information of the local face capturing unit; and a local face data generation unit configured to generate texture information and shape information by performing image processing on each of the local face images, and generate local face data based on the texture information and the shape information.

In accordance with a second aspect of the present invention, there is provided a method for managing face data, including: capturing a global face image; obtaining shape information and texture information of global face data by measuring a phase shift in the global face image and by estimating a three-dimensional (3D) position of a face, and generating the global face data using the shape information and the texture information; capturing a plurality of local face images while contacting a surface of the face or approaching the face up to a preset distance; estimating a position and a direction of the face of a captured user upon capturing the local face images, thus extracting a global face posture; extracting posture information of a device for capturing the local face images; and generating texture information and shape information by performing image processing on each of the local face images, and generating local face data based on the texture information and the shape information.

In accordance with the present invention, global face data, local face data, and face matching data indicative of correspondence relationships between the global face data and the local face data may be automatically generated and stored, such that a user may explore face data at a desired facial position and magnification and in a desired facial direction using a device such as a mouse and a keyboard, and then view the explored data on a display device such as a monitor.

As described above, the present invention provides an apparatus and method which are capable of automatically generating and storing global face data, local face data, and face matching data indicative of the correspondence relationships between the global face data and the local face data. Accordingly, the apparatus and method are advantageous in that a user may explore the face data at a desired facial position and magnification and in a desired facial direction using an interface device such as a mouse or a keyboard, and then view the explored data on a display device such as a monitor.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
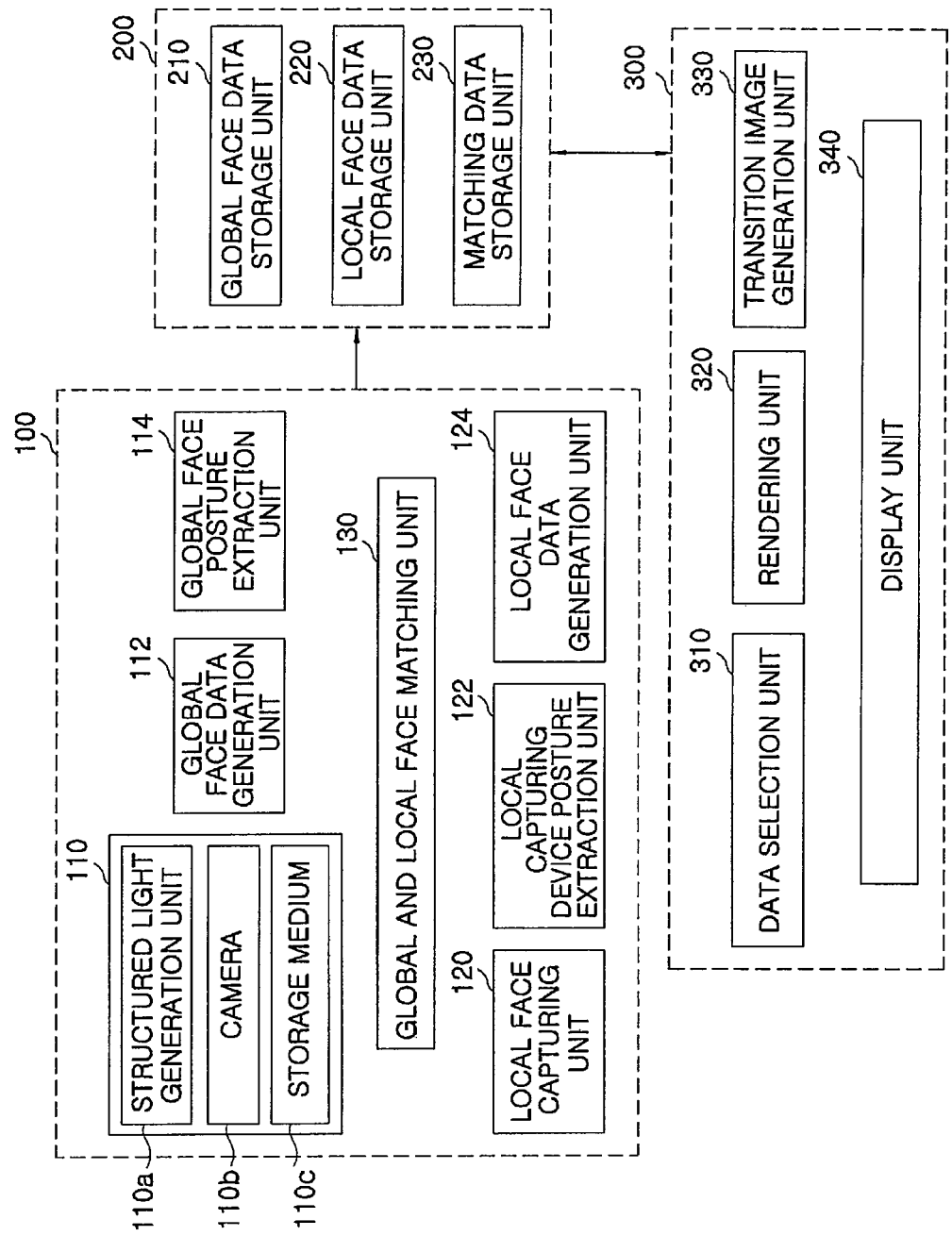
FIG. 1 is a block diagram of a system for managing face data in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed according to operators intend for the invention and practice. Hence, the terms need to be defined throughout the description of the present invention.

FIG. 1 is a block diagram of a system for managing face data in accordance with an embodiment of the present invention.

As shown in FIG. 1, the face data management system in accordance with the embodiment of the present invention may include a face data generation device 100, a face data storage device 200, and a face data exploration device 300. The face data generation device 100 generates global face data, local face data, and global and local face matching data indicating correspondence relationships between the global face data and the local face data. The face data storage device 200 stores the global face data, the local face data, and the global and local face matching data generated by the face data generation device 100. The face data exploration device 300 receives input from a user using a user interface device, such as a mouse and a keyboard, and displays a face image on a display device such as a monitor at a facial position and magnification and in a facial direction which are desired by the user, thus allowing the user to view the displayed face image.

First, the face data generation device 100 may include a global face capturing unit 110, a global face data generation unit 112, a global face posture extraction unit 114, a local face capturing unit 120, a local capturing device posture extraction unit 122, a local face data generation unit 124, and a global and local face matching unit 130.

The global face capturing unit 110 may sequentially project coded patterns using a structured light generation unit 110a such as a projector, capture an image of a scene on which structured light is projected using a camera 110b, or capture N pairs of intensity images or color images using stereoscopic or a plurality of cameras 110b, and then store the captured N pairs of intensity images or color images in a storage medium 110c such as a hard disk or Random Access Memory (RAM).

The global face data generation unit 112 may estimate the three-dimensional (3D) position of the face by measuring a phase shift from the image on which the structured light has been projected, or may obtain the 3D position of the face using triangulation from the correspondence relationships between the image pairs, thus generating shape information of the global face data.

The texture information of the global face data may be extracted in such a way that, in the case of a structured light scheme, the global face capturing unit 110 separately captures an image on which the structured light is not projected, and in the case of a stereoscopic scheme, an image that becomes a reference selected from among the captured image pairs upon generating shape information.

The global face posture extraction unit 114 may estimate the position and the direction of the face of a captured user upon capturing the local face data by using an infrared sensor that is widely used in motion capture cameras or the like and a reflector holder for global face posture extraction that is attached to the head of the user, thus extracting the posture of the global face.

The local face capturing unit 120 may include therein a visible lighting device, an ultraviolet light emitting device, and the like, and is then capable of capturing the skin of the face as a visible image or an ultraviolet image magnified at a high-power magnification while contacting or approaching the surface of the face.

The local capturing device posture extraction unit 122 may estimate the position and the direction of the local face capturing unit 120 either by using an infrared sensor that is widely used in motion capture cameras or the like and a reflector attached to the local face capturing unit 120, or by using a gyro sensor and an acceleration sensor that is included in the body of the local face capturing unit 120, thus extracting the posture information of the local face capturing unit 120.

The local face data generation unit 124 may generate texture information such as a normal skin image, a sebum distribution image, a melanin distribution image, or a hemoglobin distribution image by performing image processing on a high-magnification visible image or ultraviolet image. Further, the local face data generation unit 124 may selectively generate shape information by estimating a coordinate of a bright skin region to be a position on the surface of the skin using the brightness information of the visible image and estimating a dark region caused by wrinkles or pores to be a 3D coordinate recessed relative to the skin surface. In addition, the local face data generation unit 124 may integrate the texture information and the shape information of pieces of neighboring local face data by generating, registering, and merging the correspondence relationships between the pieces of neighboring local face data using the position and the direction of the local face capturing unit 120, which have been estimated by the local capturing device posture extraction unit 122 and the texture information which has been obtained at each capturing position.

The global and local face matching unit 130 may convert the position and direction of the global face data to become identical to those of the face upon capturing the local face data using the position and direction information of the face that is estimated by the local capturing device posture extraction unit 122, and may match the converted global face data with the local face data.

Further, the global and local face matching unit 130 may use the texture information of the global face data and the texture information of the local face data in the matching procedure.

The global face data generated by the above procedure may be stored in the global face data storage unit 210 of the storage device 200, and the local face data may be stored in the local face data storage unit 220 of the storage device 200.

Further, the matching data in which the local face data is matched with the global face data may be stored in the matching data storage unit 230.

That is, the global face data storage unit 210 may store the global face shape information and texture information generated by the global face data generation unit 112.

The local face data storage unit 220 may store the local face shape information and texture information generated by the local face data generation unit 124.

The matching data storage unit 230 may store face matching data indicating the correspondence relationships between the global face data and the local face data generated by the global and local face matching unit 130.

Figure 2:
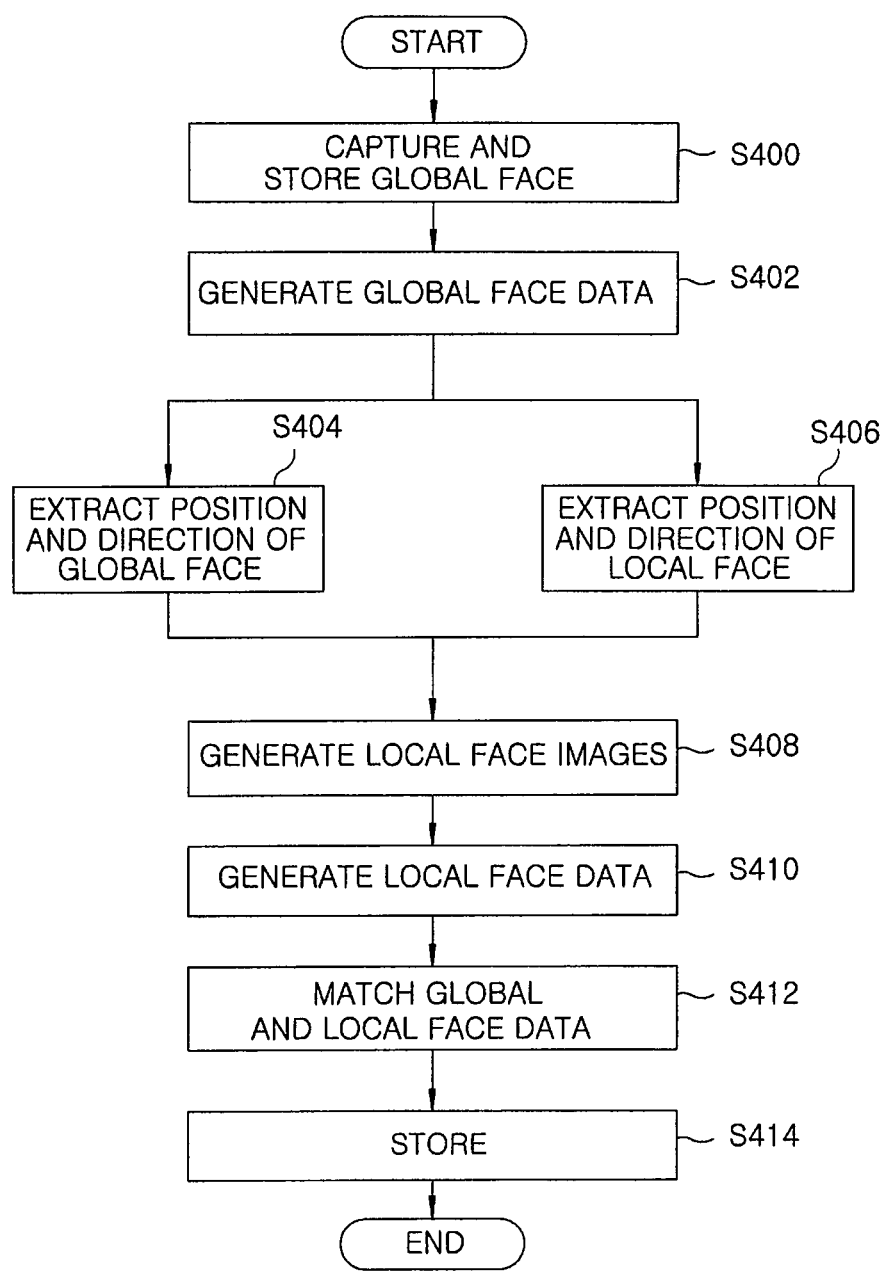
FIG. 2 is a flow chart showing a procedure of generating face data in accordance with the embodiment of the present invention.

FIG. 2 is a flow chart showing a face data generation procedure in accordance with an embodiment of the present invention.

As shown in FIG. 2, in step S400, the global face capturing unit 110 sequentially projects coded patterns using the structured light generation unit 110a, captures an image of a scene on which the structured light is projected using the camera 110b or captures N pairs of intensity or color images using stereoscopic or a plurality of cameras, and then stores the captured N pairs of intensity or color images in the storage medium 110c.

Thereafter, the global face data generation unit 112 generates global face data (3D global face data) by generating shape information and texture information from the captured face images in step S402.

Next, in step S404, the global face posture extraction unit 114 estimates the position and the direction of the face of the captured user when the local face capturing unit 120 captures local face data by using an infrared sensor widely used in motion capture cameras or the like and a reflector holder for global face posture extraction attached to the head of the user, thus extracting information about the position and the direction of the global face.

In step S406, The local capturing device posture extraction unit 122 may estimate the position and the direction of the local face capturing unit 120 by either using an infrared sensor widely used in motion capture cameras or the like and a reflector attached to the local face capturing unit 120, or using a gyro sensor and an acceleration sensor included in the body of the local face capturing unit 120.

In step S408, the local face capturing unit 120 may capture the skin of the face as a visible image or an ultraviolet image magnified at a high-power magnification while contacting or approaching the surface of the face using a visible lighting device, an ultraviolet light emitting device, and the like that are included in the local face capturing unit 120, thus generating each local face image.

In step S410, the local face data generation unit 124 may generate texture information such as in a normal skin image, a sebum distribution image, a melanin distribution image, or a hemoglobin distribution image by performing image processing on the visible image or the ultraviolet image captured by the local face capturing unit 120, and may selectively generate the shape information of the local face data by using the brightness information of the visible image. That is, the local face data generation unit 124 estimates a coordinate of a bright skin region to be a position on the surface of a skin and estimates a dark region caused by wrinkles or pores to be a 3D coordinate recessed relative to the skin surface, and then generates the local face data.

Next, in step S412, the global and local face matching unit 130 may convert the position and direction of the global face data to become identical to those of the face upon capturing local face data using the position and direction information of the face that is estimated in step S406, and match the resulting global face data with the local face data, thus generating matching data.

Thereafter, in step S414, the global face data including the face shape information and texture information generated in step S402, the local face data including the local face shape information and texture information generated in step S410, and the matching data generated in step S412 are stored in the respective storage units of the storage device 200.

The global face data, the local face data, and the matching data generated in accordance with the embodiment of the present invention may be explored by the face data exploration device 300. Such a face data exploration device 300 may include a data selection unit 310, a rendering unit 320, a transition image generation unit 330, and a display unit 340.

The data selection unit 310 provides an interface enabling magnification information, position, direction, and the like to be entered, and allows the user to select face data corresponding to his or her desired position and high-power or low-power magnification from among pieces of the global and local face data on the basis of the magnification information that has been input via the interface. For example, when the user desires a high-power magnification based on a preset threshold high-power/low-power magnification, the local face data is selected, whereas when the user desires a low-power magnification, the global face data is selected.

Further, the data selection unit 310 may forcibly limit the determination of global or local face data according to the intention of the user. For example, when the user desires to magnify and view the global face data, the data selection unit 310 may select the global face data even at a magnification higher than the magnification threshold without making a transition to local face data. On the other hand, when the user desires to reduce and view local face data, the data selection unit 310 may select the local face data even at a magnification lower than the magnification threshold without making a transition to the global face data.

As described above, the face data selected by the data selection unit 310 is provided to the rendering unit 320. The rendering unit 320 may perform rendering corresponding to the user's desired view point and desired magnification on the face data selected by the data selection unit 310, and then generate the face image.

The transition image generation unit 330 may generate a transition image in which a transition between previously determined face data and current face data is made in such a way that face data makes the transition from the global face data to the local face data or from the local face data to the global face data. That is, results obtained by rendering all of the global and local face data using the rendering unit 320 are combined using a gradually transitioned alpha map, so that an image sequence representing the effect of making a transition from the global face data to the local face data or from the local face data to the global face data may be generated.

The display unit 340 may display the images generated by the rendering unit 320 on a display device such as a Liquid Crystal Display (LCD) or a Cathode Ray Tube (CRT).

Figure 3:
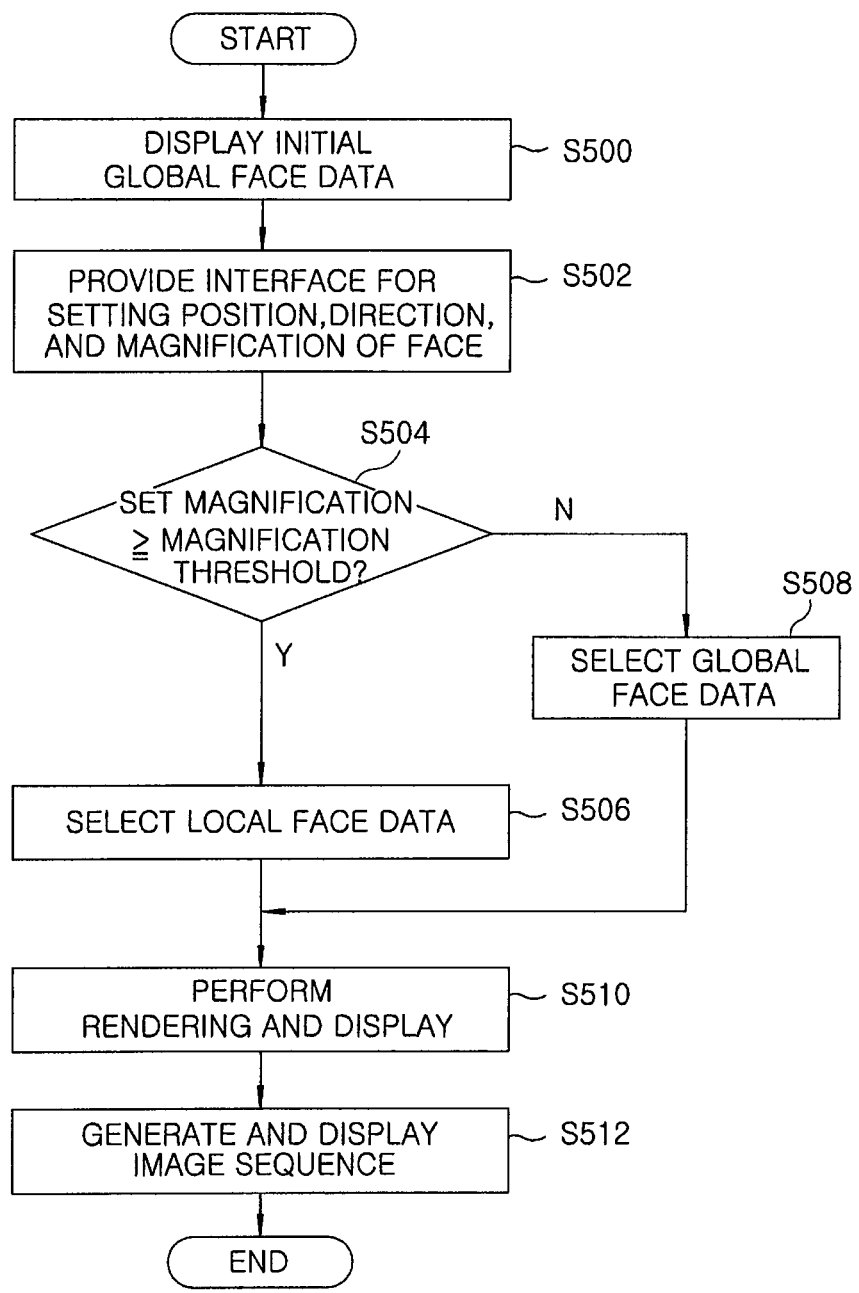
FIG. 3 is a flow chart showing a procedure of exploring the face data, which is performed by a face data exploration device in accordance with the embodiment of the present invention.

FIG. 3 is a flow chart showing a procedure of exploring face data, which is performed by the face data exploration device in accordance with an embodiment of the present invention.

In the method for exploring the face data in accordance with the embodiment of the present invention, As shown in FIG. 3, the face data exploration device 300 displays rendered images of the global face data on the display device at a position, in a direction, and at a magnification that have been previously given as initial values in step S500.

Next, in step S502, the data selection unit 310 provides an interface allowing the user to set the position, direction, and magnification of the face desired to be viewed via a user input device (not shown) such as a keyboard or a mouse while the user is viewing the images, displayed in step S500. Thereafter, in step S504, the data selection unit 310 compares the high-power/low-power magnification of the face set by the user with a preset magnification threshold as the position, direction, and magnification have been set via the interface.

If it is determined that the set magnification of the face is equal to or greater than the preset magnification threshold in step S504, the data selection unit 310 selects local face data in step S506. On the other hand, it is determined that the set magnification is less than the magnification threshold in step S504, the data selection unit 310 selects global face data in step S508.

Next, in step S510, the rendering unit 320 generates a face image by performing rendering on the face data selected by the data selection unit 310, and displays the generated face image on the display device.

In the method for exploring the face data in accordance with the embodiment of the present invention, when a request has been made for the generation of the effect of making a transition between previously determined face data and current face data, such as from the global face data to the local face data or vice versa, the rendering unit 320 renders all of the global and local face data and provides the rendered global and local face data to the transition image generation unit 330. The transition image generation unit 330 may generate an image sequence representing the effect of making a transition from the global face data to the local face data or from the local face data to the global face data by combining the rendered global and local face data using a gradually transitioned alpha map, and then display the image sequence on the display unit 340 in step S512.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A system for managing face data, comprising:
   a global face capturing unit configured to capture a global face image;
   a global face data generation unit configured to obtain shape information and texture information of global face data by measuring a phase shift in the global face image and by estimating a three-dimensional (3D) position of a face, and generate the global face data using the shape information and the texture information;
   a local face capturing unit configured to capture a plurality of local face images while contacting a surface of the face or approaching the face up to a preset distance;
   a global face posture extraction unit configured to estimate a position and a direction of the face of a captured user upon capturing the local face images using the local face capturing unit to extract a global face posture;
   a local capturing device posture extraction unit configured to extract posture information of the local face capturing unit; and
   a local face data generation unit configured to generate texture information and shape information by performing image processing on each of the local face images, and generate local face data based on the texture information and the shape information.

2. The system of claim 1, wherein:
   the global face capturing unit captures the global face image on which structured light is projected, and
   the global face data generation unit obtains shape information of the global face data by measuring a phase shift in the image on which the structured light has been projected and by estimating the 3D position of the face, and also obtains texture information of the global face data by capturing an image on which the structured light is not projected, and then generates the global face data using the shape information and the texture information.

3. The system of claim 1, wherein:
   the global face capturing unit captures N pairs of intensity or color global face images using stereoscopic or at least two cameras, and
   the global face data generation unit obtains shape information of the global face data by estimating the 3D position of the face using triangulation from correspondence relationships among the N pairs of intensity or color global face images, and also obtains texture information of the global face data by selecting an image that becomes a reference from among the captured N pairs of intensity or color global face images, and then generates the global face data using the shape information and the texture information.

4. The system of claim 1, wherein the local face capturing unit captures skin of the face while contacting or approaching the surface of the face up to the preset distance, and then obtains visible images or ultraviolet images corresponding to the local face images, respectively.

5. The system of claim 4, wherein the local face data generation unit generates texture information using the visible images or ultraviolet images obtained by the local image capturing unit, generates shape information in a form of positions of 3D coordinates using the visible images, generates, registers or merges correspondence relationships between neighboring local face images using the posture information of the local face capturing unit estimated by the posture extraction unit and the texture information, and then integrates the texture information and the shape information of the neighboring local face images with each other.

6. The system of claim 1, wherein the local capturing device posture extraction unit estimates a position and a direction of the local face capturing unit using a gyro sensor and an acceleration sensor mounted in the local face capturing unit, thus extracting the posture information of the local face capturing unit.

7. The system of claim 1, wherein the local capturing device posture extraction unit estimates a position and a direction of the local face capturing unit using an infrared sensor of the local face capturing unit and a reflector attached to the local face capturing unit, thus extracting the posture information of the local face capturing unit.

8. The system of claim 1, further comprising a data matching unit configured to convert the position and the direction of the global face data to become identical to those of the face, which are estimated by the local capturing device posture extraction unit, and then match the converted global face data with the local face data.

9. The system of claim 8, wherein the data matching unit matches the converted global face data with the local face data using the texture information of the global face data and the texture information of the local face data.

10. The system of claim 8, further comprising a storage device configured to store the global face data, the local face data, and matching data obtained by the data matching unit.

11. The system of claim 1, further comprising an exploration device configured to select and display one of the local face data and the global face data based on magnification information entered by the user via an interface.

12. The system of claim 11, wherein the exploration device comprises:
a data selection unit configured to select the local face data when the magnification information entered via the interface is equal to or greater than a preset threshold, and select the global face data when the magnification information is less than the preset threshold; and
a rendering unit configured to perform rendering on the data selected by the data selection unit and display rendered results on a display device.

13. The system of claim 12, wherein the data selection unit selects one of the local face data and the global face data according to selection of the user regardless of the magnification information.

14. The system of claim 12, wherein:
the rendering unit renders global and local face data selected by the data selection unit, and
the exploration device further comprises a transition image generation unit for combining the rendered data using a gradually transitioned alpha map, and then generating an image sequence representing an effect of making a transition from global face data to local face data or from local face data to global face data.

15. A method for managing face data, comprising:
capturing a global face image;
obtaining shape information and texture information of global face data by measuring a phase shift in the global face image and by estimating a three-dimensional (3D) position of a face, and generating the global face data using the shape information and the texture information;
capturing a plurality of local face images while contacting a surface of the face or approaching the face up to a preset distance;
estimating a position and a direction of the face of a captured user upon capturing the local face images, thus extracting a global face posture;
extracting posture information of a device for capturing the local face images; and
generating texture information and shape information by performing image processing on each of the local face images, and generating local face data based on the texture information and the shape information.

16. The method of claim 15, wherein:
said capturing a global face image is performed to capture the global face image on which structured light is projected, and
said generating the global face data comprises:
obtaining shape information of the global face data by measuring a phase shift in the image on which the structured light has been projected and by estimating the 3D position of the face,
obtaining texture information of the global face data by capturing an image on which the structured light is not projected, and
generating the global face data using the shape information and the texture information.

17. The method of claim 15, wherein:
said capturing the global face image is performed to capture N pairs of intensity or color global face images using stereoscopic or at least two cameras, and
said generating the global face data comprises:
obtaining shape information of the global face data by estimating the 3D position of the face using triangulation from correspondence relationships among the N face images;
obtaining texture information of the global face data by selecting an image that becomes a reference from among the captured N images; and
generating the global face data using the shape information and the texture information.

18. The method of claim 15, wherein:
said capturing the local face images is performed to capture skin of the face while contacting or approaching the surface of the face up to the preset distance, and then obtain visible images or ultraviolet images corresponding to the local face images, respectively, and
said generating the local face data comprises:
generating texture information using the visible images or ultraviolet images, and generating shape information in a form of positions of 3D coordinates using the visible images, and
generating, registering or merging correspondence relationships between neighboring local face images using the posture information of the device for capturing the local face images and the texture information, and then integrating the texture information and the shape information of the neighboring local face images with each other, with a result that the local face data is generated.

19. The method of claim 15, further comprising:
converting the position and the direction of the global face data to become identical to the estimated position and direction of the face; and
matching the converted global face data with the local face data, and then generating matching data.

20. The method of claim 15, further comprising selecting and displaying one of the local face data and the global face data based on magnification information entered by the user via an interface.

* * * * *